(12) United States Patent
Ohmori

(10) Patent No.: US 10,344,803 B2
(45) Date of Patent: Jul. 9, 2019

(54) SEALING DEVICE

(71) Applicant: UCHIYAMA MANUFACTURING CORP., Okayama (JP)

(72) Inventor: Kentaro Ohmori, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 21 days.

(21) Appl. No.: 15/564,587

(22) PCT Filed: Dec. 10, 2015

(86) PCT No.: PCT/JP2015/084591
§ 371 (c)(1),
(2) Date: Oct. 5, 2017

(87) PCT Pub. No.: WO2016/174792
PCT Pub. Date: Nov. 3, 2016

(65) Prior Publication Data
US 2018/0087575 A1    Mar. 29, 2018

(30) Foreign Application Priority Data
Apr. 30, 2015  (JP) .................................. 2015-092561

(51) Int. Cl.
*F16C 33/80* (2006.01)
*F16C 33/78* (2006.01)
(Continued)

(52) U.S. Cl.
CPC ........ *F16C 33/805* (2013.01); *F16C 33/7823* (2013.01); *F16C 33/7883* (2013.01);
(Continued)

(58) Field of Classification Search
CPC .................................................. F16C 33/805
See application file for complete search history.

(56) References Cited

U.S. PATENT DOCUMENTS 5,890,812 A * 4/1999 Marcello ............. F16C 33/7813
384/148
7,066,467 B2 * 6/2006 Sakata .................... F16C 19/49
277/351

(Continued)

FOREIGN PATENT DOCUMENTS

JP      H03-59562 U     6/1991
JP      2006-342827 A   12/2006
(Continued)

*Primary Examiner* — Thomas R Hannon
(74) *Attorney, Agent, or Firm* — Muncy, Geissler, Olds & Lowe, P.C.

(57) ABSTRACT

A sealing device provided between an outer member and an inner member that coaxially rotates relative to the outer member. The sealing device includes a first member in a form of a double cylinder being fitted onto the inner member; and a second member including a core member that is fitted into the outer member and a seal lip portion made of elastic material that is fixed to the core member and elastically contacts the first member, the first member and the second member being combined. The first member includes an inner diametrical side cylindrical portion and an outer diametrical side cylindrical portion that extend toward the second member in an axial direction. The outer diametrical side cylindrical portion of the first member has a first labyrinth portion and a second labyrinth portion between the outer diametrical side cylindrical portion and the second member, the first labyrinth portion being provided in the axial direction, the second labyrinth portion being provided in a radial direction and connected to the first labyrinth portion, the first labyrinth portion being equal to or more than 1.5 mm in length along a shaft.

10 Claims, 7 Drawing Sheets

(51) Int. Cl.
*F16C 41/00* (2006.01)
*F16J 15/3204* (2016.01)
*F16J 15/447* (2006.01)
*F16J 15/3264* (2016.01)
*F16C 19/18* (2006.01)

(52) U.S. Cl.
CPC ......... *F16C 41/007* (2013.01); *F16J 15/3204* (2013.01); *F16J 15/3264* (2013.01); *F16J 15/447* (2013.01); *F16C 19/186* (2013.01)

(56) References Cited

U.S. PATENT DOCUMENTS

| | | | |
|---|---|---|---|
| 8,016,294 B2 * | 9/2011 | Shibayama | B60B 27/0005 277/551 |
| 9,534,636 B2 * | 1/2017 | Takayama | F16C 33/7823 |
| 2003/0001341 A1 | 1/2003 | Sakata | |
| 2009/0127796 A1 | 5/2009 | Kanzaki et al. | |

FOREIGN PATENT DOCUMENTS

| | | | |
|---|---|---|---|
| JP | 2007-187319 A | | 7/2007 |
| JP | 2010-91036 A | | 4/2010 |
| JP | 2015-45387 A | | 3/2015 |
| JP | 2015110958 | * | 6/2015 |
| WO | WO-02/053930 A1 | | 7/2002 |

\* cited by examiner

| | | d1(mm) | d2(mm) | a (mm) | Experiment Result (Seal Life) |
|---|---|---|---|---|---|
| Sample 1 | Comparison | 0.60 | 0 | — | 1 |
| | Experiment 1 | 1.50 | 0.90 | 1.00 | 1.42 |
| | Experiment 2 | 2.10 | 1.50 | 0.40 | 1.48 |
| Sample 2 | Comparison | 0.60 | 0 | — | 1 |
| | Experiment 1 | 1.80 | 1.20 | 1.00 | 1.51 |
| | Experiment 2 | 2.20 | 1.60 | 0.40 | 1.31 |
| Sample 3 | Comparison | 1.35 | 0 | — | 1 |
| | Experiment 1 | 3.00 | 1.60 | 0.50 | 1.41 |

*Fig. 6*

SEALING DEVICE

TECHNICAL FIELD

The present invention relates to a sealing device, for instance, used in a bearing device of a wheel supporting portion of a vehicle. More specifically, the present invention relates to a sealing device that is mounted between an outer ring, i.e. an outer member, and an inner ring, i.e. an inner member.

BACKGROUND ART

An example of the above, disclosed in Patent Literatures 1 to 3 below, is the one constituted by combining a first member integrally attached to an inner member and a second member; the second member is integrally attached to an outer member and has a seal lip portion that is made of elastic material and elastically contacts the first member. Patent Literatures 1 to 3 disclose the sealing device in which the first member, i.e. a slinger, has a first cylindrical portion, a circular plate portion, and a second cylindrical portion. The first cylindrical portion is fitted to the inner member; the circular plate portion extends into an outer diametrical side from an end portion of the first cylindrical portion on an opposite side to the second member; and the second cylindrical portion extends in the same direction as the first cylindrical portion from an outer diametrical side end portion of the circular plate portion in the axial direction. The second member of the sealing device has a core member and the seal lip portion. The core member has a cylindrical portion that is fitted to the outer member, and a flange portion that extends from one end portion of the cylindrical portion into an inner diametrical side. The seal lip portion, made of elastic material, is fixed to the core member and elastically contacts the slinger. A labyrinth portion is formed between opposite faces of the second cylindrical portion of the first member and the second member.

CITATION LIST

Patent Literature

Patent Literature 1: Japanese Unexamined Utility Model Application Publication No. H03-59562
Patent Literature 2: Japanese Unexamined Patent Application Publication No. 2006-342827
Patent Literature 3: Japanese Unexamined Patent Application Publication No. 2010-91036

SUMMARY OF INVENTION

Technical Problem

In the sealing device disclosed in Patent Literatures 1 to 3, a slinger is constituted with the first cylindrical portion on the inner diametrical side, the circular plate portion, and the second cylindrical portion on the outer diametrical side, and the section of the slinger is formed like a reclined letter U in a double cylinder shape. The labyrinth portion is formed by the second cylindrical portion of the slinger and the second member so that the length of the labyrinth portion in the axial direction is adequately kept. Therefore, intrusion of muddy water or the like including dust, hereinafter referred to as muddy water, from outside through the labyrinth portion into the sealing device is effectively prevented. However, when the section of the slinger is formed in a reclined U shape as mentioned above, once muddy water intrudes in the sealing device, it is difficult to discharge muddy water outside and the intruded muddy water is gradually accumulated in a space surrounded by the slinger and the second member. Foreign objects such as dust contained in muddy water are jammed into an elastic contact portion of a side lip to the circular plate portion of the slinger, thereby an elastic sliding contact portion of the side lip to the circular plate portion is worn away in accordance with rotation of a rotation side member. Such abrasion makes muddy water further intrude into an objective bearing space from the elastic contact portion of the side lip to the circular plate portion through the sealing device. There occur problems in deteriorating seal function over time and the life of the sealing device.

The present invention is proposed in view of the above mentioned problems. In a sealing device of the present invention in which a first member is a double cylindrical shape, the length of an outer diametrical side cylindrical portion of the first member in the axial direction, the length of an inner diametrical side region of the outer diametrical side cylindrical portion in the axial direction, and the capacity of the labyrinth, i.e. a gap, between the outer diametrical side cylindrical portion and the second member are appropriately set. An object of the present invention is to provide the sealing device that prevents intrusion of muddy water into the sealing device, enhances discharge ability of intruding muddy water, and prolongs the life of the sealing device.

Solution to Problem

The present invention relates to a sealing device provided between an outer member and an inner member that coaxially rotates relative to the outer member. The sealing device includes a first member in a form of a double cylinder being fitted onto the inner member; and a second member including a core member that is fitted into the outer member and a seal lip portion made of elastic material that is fixed to the core member and elastically contacts the first member, the first member and the second member being combined. The first member includes an inner diametrical side cylindrical portion and an outer diametrical side cylindrical portion that extend toward the second member in axial direction, the outer diametrical side cylindrical portion of the first member has a first labyrinth portion and a second labyrinth portion between the outer diametrical side cylindrical portion and the second member, the first labyrinth portion is provided in axial direction, the second labyrinth portion is provided in radial direction and connected to the first labyrinth portion, and the first labyrinth portion is equal to or more than 1.5 mm in length in axial direction.

In the present invention, the seal lip made of elastic material provided for the second member elastically contacts the first member, so that the seal lip portion relatively and slidably contacts the first member in an elastic manner when the inner member coaxially rotates relative to the outer member. Therefore, when the inner member coaxially rotates as mentioned above, muddy water is prevented from intruding into the objective sealing space between the outer member and the inner member through the sealing device from outside. In addition, the first member is in the form of a double cylinder including the inner diametrical side cylindrical portion and the outer diametrical side cylindrical portion, and the outer diametrical side cylindrical portion of the first member has the first labyrinth portion provided in the axial direction between the outer side cylindrical portion and the second member, and the second labyrinth portion provided in the radial direction and connected to the first labyrinth portion. Therefore, the actual intrusion route of muddy water from outside into the sealing device becomes longer. In addition, by a centrifugal action and a pumping action of the first member in accordance with axial rotation of the inner member, intrusion of muddy water into the sealing device is effectively prevented, and muddy water that has once intruded into the bearing device is effectively discharged. Thereby, jamming of dust or the like contained in muddy water into an elastic contact portion of the seal lip portion relative to the first member decreases. Further, abrasion of the seal lip portion over time is suppressed by the above-mentioned relatively slidable contact in an elastic manner of the seal lip portion relative to the first member in accordance with axial rotation of the first member, thereby the life of the sealing device is prolonged. The length of the first labyrinth portion in the axial direction is equal to or larger than 1.5 mm, so that intrusion prevention function of muddy water into the sealing device and the above-mentioned discharge function are effectively achieved. When the length of the first labyrinth portion in the axial direction is less than 1.5 mm, intrusion prevention function of muddy water into the sealing device and the above-mentioned discharge function are deteriorated. The length of the first labyrinth portion in the axial direction is set equal to or larger than 1.5 mm depending on the specification of the sealing device and the space range of the region for which the sealing device is provided.

In the sealing device of the present invention, an inner diametrical region of the outer diametrical side cylindrical portion of the first member is equal to or more than 0.75 mm in length in axial direction.

In the embodiment of the present invention, the inner diametrical region of the outer diametrical side cylindrical portion of the first member is equal to or larger than 0.75 mm in length along the shaft, so that a space surrounded with the first member and the second member is widely secured and the discharge function of muddy water in the space to outside through the labyrinth portion is easily achieved in accordance with the axial rotation of the inner member. Therefore, even when muddy water intrudes into the sealing device through the first and the second labyrinth portions, the intruded muddy water is rapidly discharged through the labyrinth portions and is suppressed from staying in the sealing device. Thus, jamming of dust or the like into the elastic contact portion of the seal lip portion and the first member effectively decreases and the life of the sealing device is prolonged. When the inner diametrical region of the outer diametrical side cylindrical portion is less than 0.75 mm in length along the shaft, the discharge effect of muddy water by the centrifugal force as mentioned above is reduced. The inner diametrical region of the outer diametrical side cylindrical portion is set equal to or larger than 0.75 mm in length along the shaft depending on the specification of the sealing device and the space range of the region for which the sealing device is provided.

In the sealing device of the present invention, the second labyrinth portion includes a gap equal to or less than 1 mm in length.

In the embodiment of the present invention, the gap of the second labyrinth portion is equal to or less than 1 mm in length, so that muddy water is prevented from further proceeding into the device by the second labyrinth portion even when muddy water intrudes in the first labyrinth portion. If the gap of the second labyrinth portion is larger than 1 mm in length, muddy water intruded in the first labyrinth portion is apt to further proceed into the sealing device. The gap of the second labyrinth portion is set equal to or less than 1 mm in length depending on the specification of the sealing device and the region for which the sealing device is provided.

In the sealing device of the present invention, the first member has a slinger in a form of a double cylinder. The slinger includes a first cylindrical portion that is fitted onto the inner member, a circular plate portion that extends into outer diametrical direction from the first cylindrical portion, and a second cylindrical portion extending from an outer circumferential edge portion of the circular plate portion. The second cylindrical portion of the slinger constitutes the outer diametrical side cylindrical portion of the first member.

In the embodiment of the present invention, the length of the first labyrinth portion corresponds to the length of the second cylindrical portion of the slinger along the axial direction, so that the intrusion route of muddy water is elongated as mentioned above. In addition, by a centrifugal action of the slinger in accordance with axial rotation of the inner member, the intrusion prevention function of muddy water into the sealing device and the discharge function are effectively achieved.

In the sealing device of the present invention, the first member has a slinger in a form of a double cylinder, the slinger includes a first cylindrical portion that is fitted onto the inner member, a circular plate portion that extends into outer diametrical direction from the first cylindrical portion, and a second cylindrical portion extending from an outer circumferential edge portion of the circular plate portion, the circular plate portion of the slinger being integrally fixed with an annular encoder for detecting rotation. The second cylindrical portion of the slinger and an outer diametrical side end portion of the annular encoder constitute the outer diametrical side cylindrical portion of the first member.

In the embodiment of the present invention, the length of the first labyrinth portion corresponds to the length of the second cylindrical portion of the slinger along the axial direction and the length of the outer diametrical side end portion of the annular encoder, so that the intrusion route of muddy water is elongated as mentioned above. In addition, by a centrifugal action of the slinger and the annular encoder in accordance with axial rotation of the inner member, the intrusion prevention function of muddy water into the sealing device and the discharge function are effectively achieved.

In the sealing device of the present invention, the second cylindrical portion of the slinger is integrally fixed with a cylindrical elastic member on an outer circumferential face, and the second cylindrical portion of the slinger that is covered with the elastic member and the outer diametrical side end portion of the annular encoder constitute the outer diametrical side cylindrical portion of the first member.

In the embodiment of the present invention, the length of the first labyrinth portion corresponds to the length of the elastic member along the axial direction and the length of the outer diametrical side end portion of the annular encoder, so that the intrusion route of muddy water is elongated as mentioned above. In addition, by a centrifugal action of the slinger and the annular encoder in accordance with axial rotation of the inner member, the intrusion prevention function of muddy water into the sealing device and the discharge function are effectively achieved.

Advantageous Effects of Invention

In the present invention, the first member of the sealing device is a double cylindrical shape, the length of the outer diametrical side cylindrical portion of the first member in the axial direction, the length of the inner diametrical side region of the outer diametrical side cylindrical portion in the axial direction, and the volume of the labyrinth, i.e. a gap, between the outer diametrical side cylindrical portion and the second member are appropriately set. Therefore, muddy water is prevented from intruding into the sealing device, the discharge ability of intruded muddy water is enhanced, and the life of the sealing device is prolonged.

BRIEF DESCRIPTION OF DRAWINGS

FIG. 6 is a table of the results of a performance test of the sealing device of the present invention.

DESCRIPTION OF EMBODIMENTS

Figure 1:
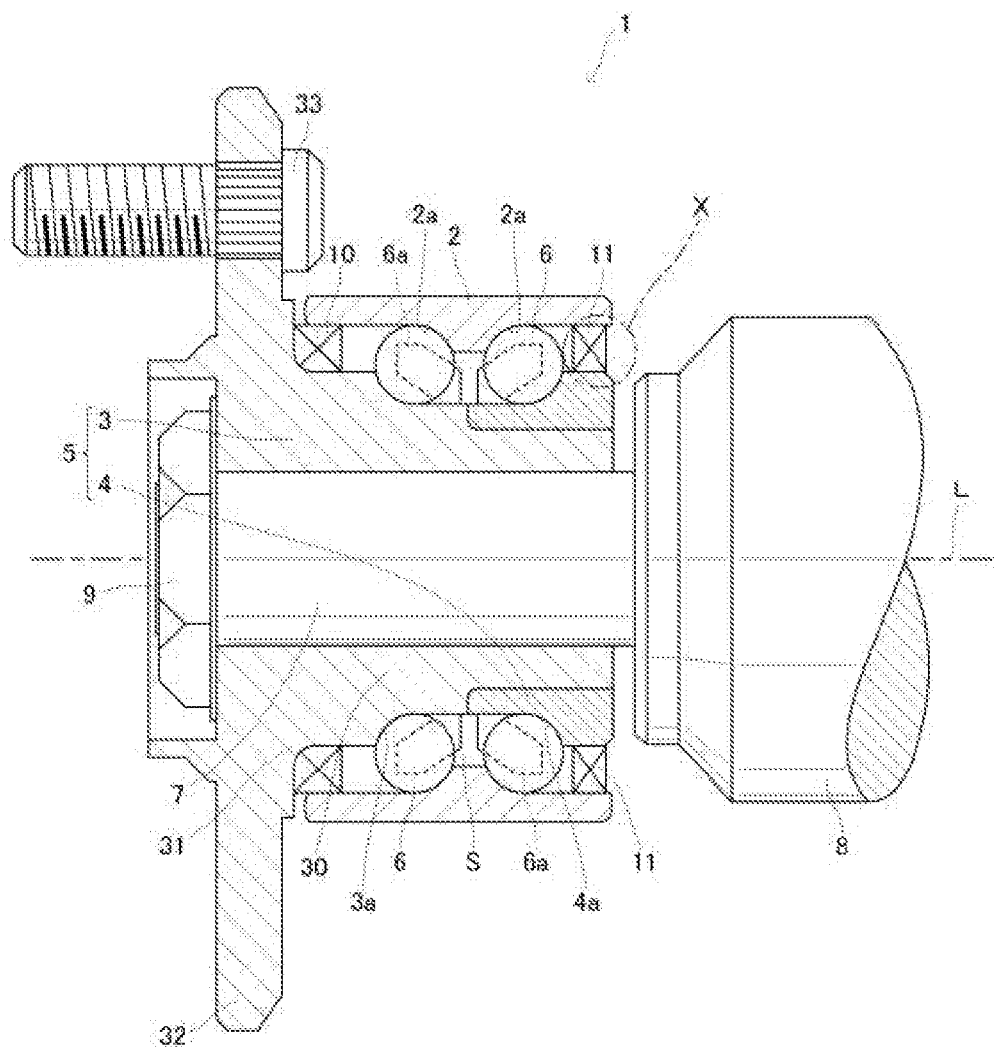
FIG. 1 is a longitudinal sectional view schematically illustrating one example of a bearing device to which the sealing device of the present invention is applied.

An embodiment of the present invention is explained below based on the drawings. FIG. 1 illustrates a bearing device 1 that supports a wheel of a vehicle (not illustrated) in an axially rotatable manner. The bearing device 1 generally includes an outer ring 2, i.e. an outer member, a hub wheel 3, an inner ring member 4 that is integrally fitted to a vehicle body side of the hub wheel 3, and two rows of rolling elements 6 . . . (balls) that are interposed between the outer ring 2 and the hub wheel 3, and between the outer ring 2 and the inner ring member 4. In the embodiment, the hub wheel 3 and the inner ring member 4 constitute the inner ring 5, i.e. the inner member. The outer ring 2 is fixed to a body of the vehicle (not illustrated). The hub wheel 3 is coaxially spline-fitted to a drive shaft 7, and the drive shaft 7 is connected to a drive source, i.e. a drive transmission portion (not illustrated), through a velocity joint 8. The drive shaft 7 is integrated with the hub wheel 3 by a nut 9, thereby preventing removal of the hub wheel 3 from the drive shaft 7. The inner ring 5, i.e., the hub wheel 3 and the inner ring member 4, is rotatable around a shaft L relative to the outer ring 2, the outer ring 2 and the inner ring 5 constitute two members that relatively rotate, and an annular space S is formed between the two members. The two rows of rolling elements 6 . . . , which are retained by the retainer 6a, are provided in the annular space S in such a manner that a track wheel 2a of the outer ring 2, a track wheel 3a of the hub wheel 3, and a track wheel 4a of the inner ring member 4 are rotatable. The hub wheel 3 has a hub wheel body 30 in a cylindrical shape and a hub flange 32 formed so as to extend into an outer diametrical side from the hub wheel body 30 through a rising base portion 31. The wheel is attached and fixed to the hub flange 32 by a bolt 33 and a nut (not illustrated). Hereinafter, a side towards the wheel in the axial direction along the shaft L (the left side in FIG. 1) is referred to as a wheel side, and a side towards the vehicle body (the right side in FIG. 1) is referred to as a vehicle body side.

The annular space S forms a bearing space; and in both end portions of the annular space S, hereinafter referred to as the bearing space, in the axial direction along the shaft L, bearing seals 10, 11 are respectively mounted between the outer ring 2 and the hub wheel 3 and between the outer ring 2 and the inner ring member 4, thereby sealing the end portions in the axial direction along the shaft L of the bearing space S. Therefore, intrusion of muddy water or the like including dust, hereinafter referred to as muddy water, into the bearing space S or leakage of lubricant such as grease filled in the bearing space S is prevented.

Figure 2:
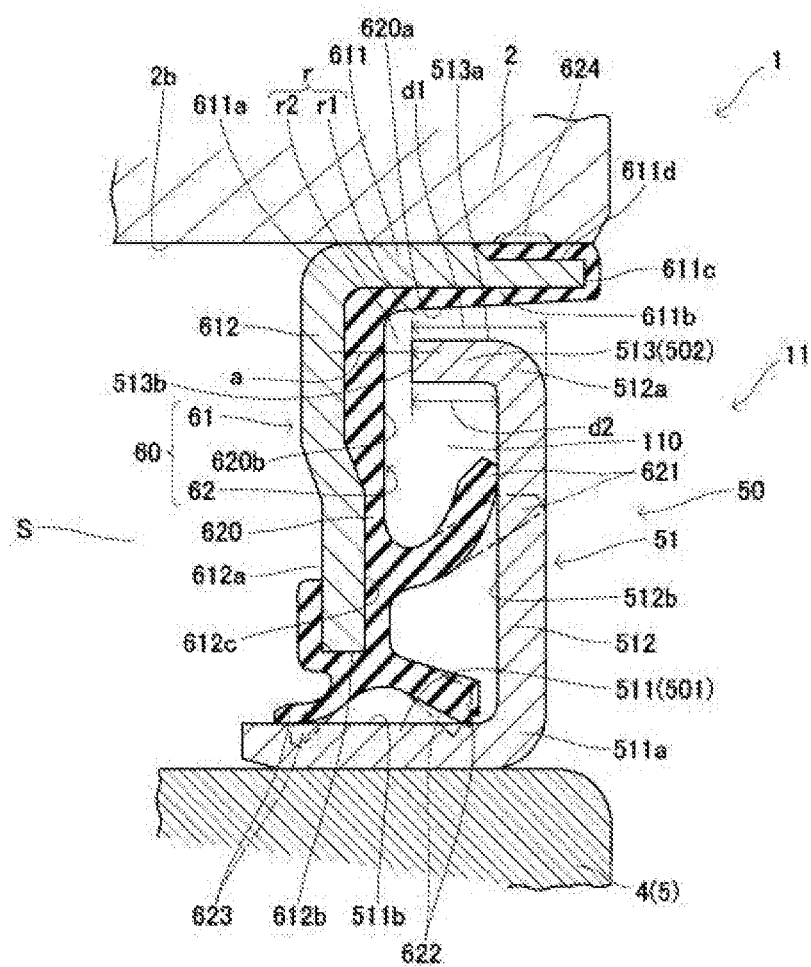
FIG. 2 is an enlarged view of a part X in FIG. 1 and illustrates a first embodiment of the sealing device of the present invention.

The sealing device of the present invention is explained referring to the bearing seal 11 on the vehicle body side. The present invention is also applied to the bearing seal 10 on the wheel side. Embodiments of the bearing seal 11, i.e., the sealing device, are explained further referring to FIG. 2 to FIG. 5. FIG. 2 illustrates the first embodiment of the sealing device of the present invention and the bearing seal 11 is attached into the bearing device 1 having the outer ring 2 and the inner ring 5. The bearing seal 11 is constituted by combining a first member 50 in a double cylindrical shape that is fitted onto the inner ring 5, i.e., an inner member, and a second member 60 that is fitted into the outer ring 2, i.e., an outer member.

In the bearing seal 11 of the embodiment, the second member 60 includes a core member 61 that is fitted into the outer ring 2, and a seal lip portion 62 that is fixed to the core member 61 and is made of elastic material. More specifically, the core member 61 includes a core member cylindrical portion 611 that is fitted into an inner diametrical face 2b of the outer ring 2. The core member 61 further includes an inward flange portion 612 extending into an inner diametrical side from an end portion 611a on the bearing space S side in the core member cylindrical portion 611. A section of the core member 61 is formed substantially in an L shape. The seal lip portion 62 made of rubber material includes a seal lip base portion 620 that is integrally fixed to the core member 61 by vulcanization molding, and a side lip 621 and two radial lips 622, 623 extending from the seal lip base portion 620. The seal lip base portion 620 is integrally fixed to the core member 61 so as to enter an inner circumferential edge portion 612b from a part of a face 612a on the bearing space S side of the inward flange portion 612 of the core member 61 and to cover an entire face 612c opposite to the bearing space S of the inward flange portion 612. The seal lip base portion 620 is integrally fixed to the core member 61 so as to cover an entire face of an inner diametrical face 611b of the core member cylindrical portion 611, to enter an end portion 611c on an opposite side to the bearing space S, and to reach an outer diametrical face 611d of the core member cylindrical portion 611. A portion that reaches the outer diametrical face 611d of the core member cylindrical portion 611 of the seal lip base portion 620 is defined as an annular projection portion 624 that bulges on the outer diametrical side. When the core member 61 is fitted into the outer ring 2, the annular projection portion 624 is configured to be interposed in a compressed state between the inner diametrical face 2b of the outer ring 2 and the outer diametrical face 611d of the core member cylindrical portion 611. Muddy water is prevented from intruding into a fitting portion between the outer ring 2 and the core member cylindrical portion 611, with the annular projection portion 624 being interposed in the compressed state between the outer ring 2 and the core member cylindrical portion 611. Thereby, generation of rust in the fitting portion between the outer ring 2 and the core member cylindrical portion 611 is prevented, and intrusion of muddy water into the bearing space S from the fitting portion is also prevented. A two-dot chain line of the annular projection portion 624 represents the original shape before compression.

The first member 50 includes the slinger 51 in a double cylindrical shape, namely having two cylindrical portions overlapped in the radial direction. The slinger 51 includes a first cylindrical portion 511, a circular plate portion 512, and a second cylindrical portion 513, and has the section in the shape of a reclined letter U. The first cylindrical portion 511 is fitted onto the inner ring 5, i.e. the inner ring member 4. The circular plate portion 512 is extended to the outer diametrical side from an end portion 511a on the opposite side to the bearing space S of the first cylindrical portion 511. The second cylindrical portion 513 is extended to the second member 60 from an outer circumferential edge portion 512a of the circular plate portion 512 in the axial direction along the shaft L. The side lip 621 of the second member 60 elastically contacts a face 512b on the bearing space side S of the circular plate portion 512 of the slinger 51. The radial lips 622, 623 elastically contact an outer diametrical face 511b of the first cylindrical portion 511 of the slinger 51. In FIG. 2, two-dot chain lines of the side lip 621 and the radial lips 622, 623 represent the original shapes before elastic deformation.

In the bearing seal 11 of the embodiment, the first cylindrical portion 511 of the slinger 51 constitutes the inner diametrical side cylindrical portion 501, and the second cylindrical portion 513 constitutes the outer diametrical side cylindrical portion 502 of the first member 50. A labyrinth structure portion "r" is formed between the second cylindrical portion 513, i.e., the outer diametrical side cylindrical portion 502, and the second member 60. The labyrinth structure portion "r" is constituted by a first labyrinth portion r1 along the shaft L, and a second labyrinth portion r2 along the radial direction that is connected with the first labyrinth portion r1. The first labyrinth portion r1 is formed between an outer circumferential face 513a of the second cylindrical portion 513 and a fitting portion of the second member 60 into the outer ring 2, the fitting portion facing the outer circumferential face 513a; the fitting portion refers to the core member cylindrical portion 611 and an inner circumferential face 620a of the seal lip base portion 620 covering the core member cylindrical portion 611. The second labyrinth portion r2 is formed in the radial direction between an end face 513b on the bearing space S side, i.e. the wheel side, of the second cylindrical portion 513 and a vehicle body side face 620b of a portion facing the end face 513b, i.e. a portion of the seal lip base portion 620 covering the side face 612c opposite to the bearing space S of the core member circular plate portion 612. The length d1 of the first labyrinth portion r1 in the axial direction along the shaft L is set equal to or larger than 1.5 mm depending on the specification of the sealing device 11 or within a space range where the sealing device 11 is provided. The length d2 of the inner diametrical side region of the outer diametrical side cylindrical portion 502 of the first member 50 in the axial direction is set equal to or larger than 0.75 mm depending on the specification of the sealing device 11 or within a space range where the sealing device 11 is provided. A gap "a" of the second labyrinth portion r2 is set equal to or less than 1 mm depending on the specification including machining tolerance of the sealing device 11 or within a space range where the sealing device 11 is provided. The gap "a" is preferably as small as possible. The first member 50 coaxially rotates relative to the second member 60, so that a minimal space including mechanical tolerance is obtained in such a manner that the end face 513b of the second cylindrical portion 513 does not hit the vehicle body side face 620b of the seal lip base portion 620 during rotation.

Figure 3:
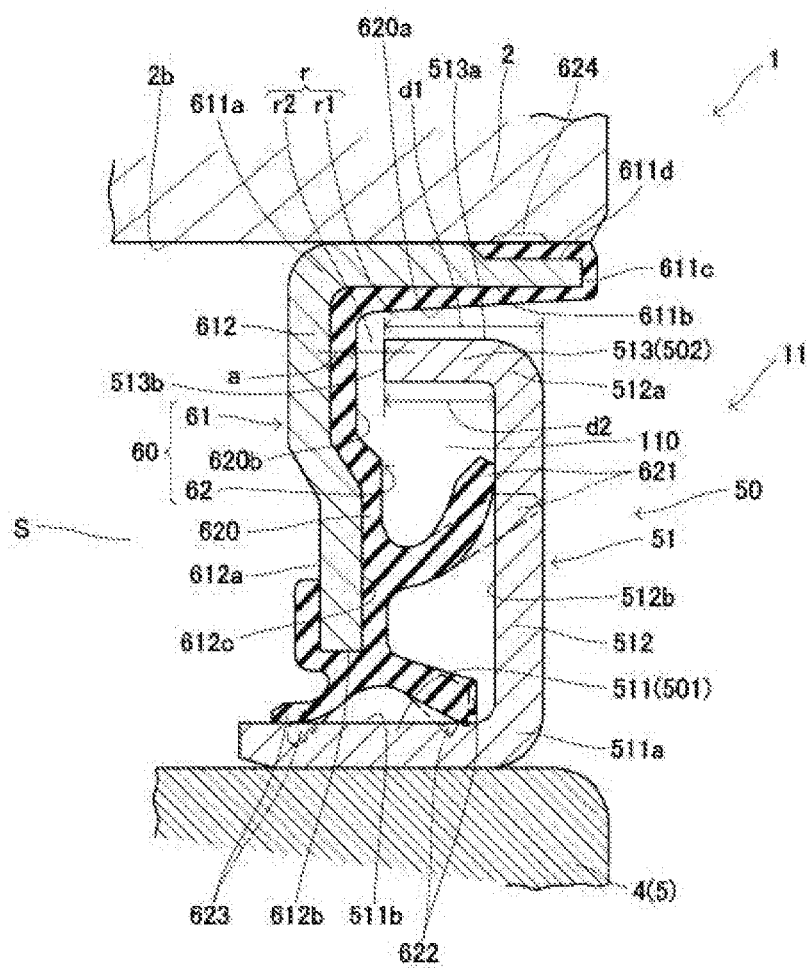
FIG. 3, similar to FIG. 2, illustrates a modified example of the sealing device of the embodiment.

FIG. 3 illustrates a modification of the above-mentioned embodiment. In the modification, the vehicle body side face 620b of the seal lip base portion 620 is dented toward the bearing space S, the vehicle body side face 620b facing the end face 513b of the second cylindrical portion 513 compared with the embodiment in FIG. 2. Thus, the length d1 of the first labyrinth portion r1 in the axial direction and the length d2 of the inner diametrical side region of the outer diametrical side cylindrical portion 502 in the axial direction are largely secured compared with the above-mentioned embodiment. Other structures are the same as the embodiment in FIG. 2, so the same members have the same reference numerals.

In the bearing device 1 in which the bearing seal 11 is incorporated like the embodiment illustrated in FIG. 2 and FIG. 3, when the drive shaft 7 rotates around the shaft L, the inner ring 5 rotates coaxially and integrally with the drive shaft 7 relative to the outer ring 2. In such a case, the side lip 51 and the radial lips 622, 623 relatively and slidably contact the circular plate portion 512 and the first cylindrical portion 511 of the slinger 51 respectively in an elastic manner. Therefore, during the operation of the bearing device 1, intrusion of muddy water into the bearing space S from outside through the bearing seal 11 is prevented. Leakage of lubricant such as grease filled in the bearing space S to the outside of the bearing device 1 is also prevented. By the combination of the first labyrinth portion r1 in the axial direction along the shaft L, the second labyrinth portion r2 along the radial direction, and the centrifugal action generated in accordance with the axial rotation of the inner ring 5, intrusion of muddy water including dust is suppressed from entering into the bearing seal 11 from outside. Since the first labyrinth portion r1 and the second labyrinth portion r2 are gaps, intrusion of muddy water is not prevented completely and some muddy water or the like unavoidably intrudes into the bearing seal 11. Muddy water intruded into the bearing seal 11 reaches a space portion 110 surrounded with the second cylindrical portion 513 and the circular plate portion 512 of the slinger 51, the side lip 621, and the seal lip base portion 620. The space portion 110 is in the shape of a pocket, and a pumping action works in the space portion 110 in accordance with the axial rotation of the inner ring 5, thereby intruded water is pushed back toward the first labyrinth portion r1 and the second labyrinth portion r2.

As mentioned above, intrusion of muddy water into the space portion 110 is suppressed by the first and the second labyrinth portions r1, r2. Even when only a little amount of muddy water intrudes into the space portion 110, the intruded muddy water is gradually accumulated in the space portion 110. Then, dust in the accumulated muddy water is jammed into an elastic contact portion of the side lip 621 and the vehicle wheel side face 512b of the circular plate portion 512, thereby a tip end of the side lip 621 is worn away by the elastic sliding contact in accordance with the axial rotation of the inner ring 5. However, the radial lip 622 facing an opposite direction of the bearing space S elastically contacts the first cylindrical portion 511, i.e., the inner diametrical side cylindrical portion 501, of the slinger 51. Therefore, even when the tip end of the side lip 621 is worn away and muddy water passes through the elastic contact portion of the side lip 621 to the circular plate portion 512, the radial lip 622 blocks further proceeding of the intruded muddy water. As a result, the seal performance of the bearing seal 11 is kept for a long time. In addition, as understood from the results of the performance tests to be mentioned later referring to FIG. 6 and FIG. 7, when the axial length d1 of the first labyrinth portion r1, the axial length d2 of the inner diametrical side region of the outer diametrical side cylindrical portion 502, and the gap "a" of the second labyrinth portion r2 are set as mentioned above, the discharge performance of muddy water once intruded in the space portion 110 is effectively achieved and the life of the bearing seal 11 is elongated.

Figure 4:
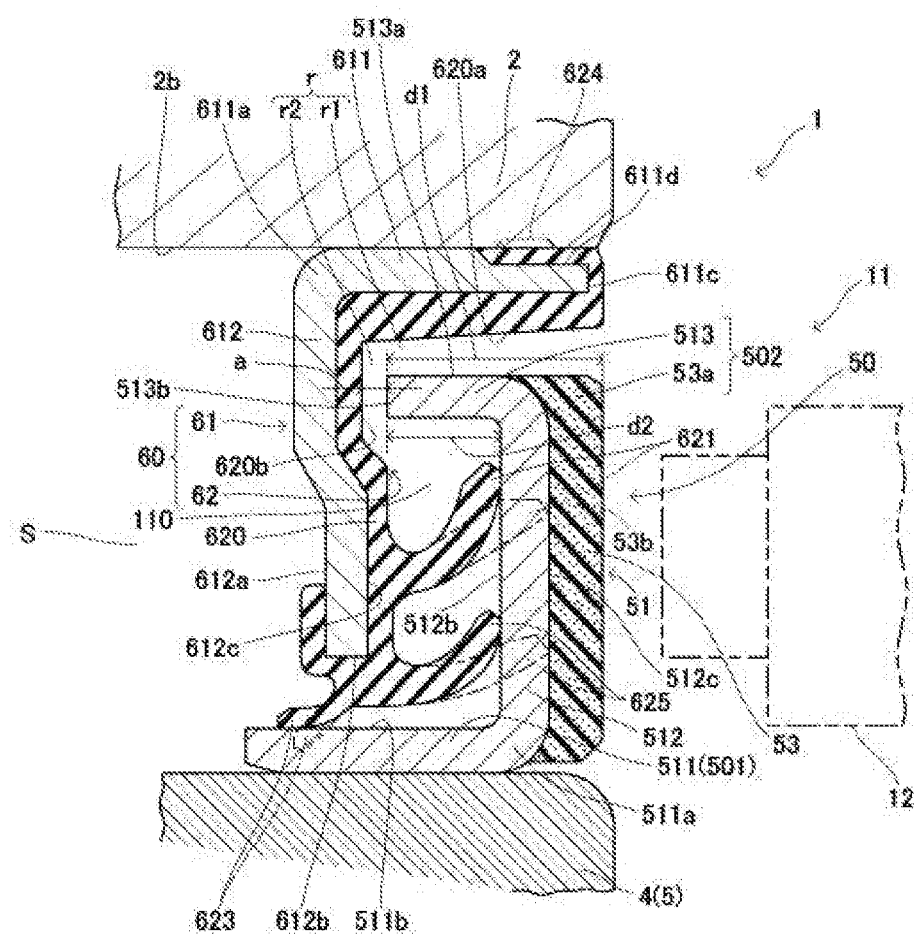
FIG. 4, similar to FIG. 2, illustrates a second embodiment of the sealing device of the present invention.

FIG. 4 illustrates a second embodiment of the sealing device of the present invention. In the bearing seal 11, i.e., the sealing device, of the embodiment, the first member 50 has the slinger 51 formed like the above-mentioned embodiment, an annular encoder 53 for detecting rotation is integrally fixed to a vehicle body side face 512c of the circular plate portion 512 of the slinger 51, and the outer diametrical side cylindrical portion 502 of the first member 50 is constituted by the second cylindrical portion 513 of the slinger 51 and an outer diametrical side end portion 53a of the annular encoder 53. The annular encoder 53 is configured such that rubber material including magnetic powder is integrated by vulcanization molding to the vehicle body side face 512c of the circular plate portion 512 and a plurality of north poles and south poles are alternately magnetized on the vehicle body side face 53b at equal intervals in the circumferential direction. A magnetic sensor 12 is installed in the vehicle body, not illustrated, so as to face the magnetized face 53b, i.e., the vehicle body side face, of the annular encoder 53. A rotation detecting structure of the inner ring 5, i.e. the wheel, is constituted by the magnetic sensor 12 and the magnetic encoder 53.

The second member 60 has the core member 61 like that in the embodiment of FIG. 3 and a rubber seal lip portion 62 fixed to the core member 61. The seal lip portion 62 is made of rubber as mentioned above and has the seal lip base portion 620 fixed to the core member 61 by vulcanization molding, two side lips 621, 625 and one radial lip 623 that extend from the seal lip portion 620. In this embodiment, the labyrinth structure portion "r" is formed between the outer diametrical side cylindrical portion 502 and the second member 60. The labyrinth structure portion "r" is constituted with the first labyrinth portion r1 in the axial direction along the shaft L and the second labyrinth portion r2 in the radial direction, the second labyrinth portion r2 being connected to the first labyrinth portion r1. The length d1 of the first labyrinth portion r1 in the axial direction is the sum of the distance value between the vehicle body side end face 512c of the circular plate 512 of the slinger 51 and an end face 513b of the second cylindrical portion 513, and the thickness value of the annular encoder 53 in the axial direction along the shaft L. The length d1 of the first labyrinth portion r1 in the axial direction is set equal to or larger than 1.5 mm depending on the specification of the sealing device 11 or within a space range where the sealing device 11 is provided, as mentioned above. The length d2 of the inner diametrical side region of the outer diametrical side cylindrical portion 502 of the first member 50 in the axial direction is set equal to or larger than 0.75 mm depending on the specification of the sealing device 11 or within a space range where the sealing device 11 is provided, as mentioned above. The gap "a" of the second labyrinth portion r2 is set equal to or less than 1 mm depending on the specification including the mechanical tolerance of sealing device 11 or within a space range where the sealing device 11 is provided.

Also in this embodiment, when the bearing seal 11 is incorporated into the bearing device 1 in FIG. 1 and the inner ring 5 rotates around the shaft L, muddy water is suppressed from intruding into the space portion 110 by the first and the second labyrinth portions r1, r2 as mentioned above. In addition, when only a little amount of muddy water intrudes into the space portion 110, the intruded muddy water is gradually accumulated in the space portion 110. Then, dust in the accumulated muddy water is jammed into an elastic contact portion of the side lip 621 to the vehicle wheel side face 512b of the circular plate portion 512, thereby the tip end of the side lip 621 is worn away by the elastic sliding contact in accordance with the axial rotation of the inner ring 5. However, another side lip 625 provided on the inner diametrical side rather than the side lip 621 elastically contacts the vehicle wheel side face 512b of the circular plate portion 512. Therefore, even when the tip end of the side lip 621 is worn away and muddy water passes through the elastic contact portion of the side lip 621 to the circular plate portion 512, the side lip 625 blocks further proceeding of the intruded muddy water. As a result, the seal performance of the bearing seal 11 is kept for a long time. In addition, as understood from the results of the performance tests to be mentioned later referring to FIG. 6 and FIG. 7, when the axial length d1 of the first labyrinth portion r1, the axial length d2 of the inner diametrical side region of the outer diametrical side cylindrical portion 502, and the gap "a" of the second labyrinth portion r2 are set as mentioned above, the discharge performance of muddy water once intruded in the space portion 110 is effectively achieved and the life of the bearing seal 11 is elongated. Other structures are the same as those in the above-mentioned embodiments, so the same members have the same reference numerals and the function and advantageous effects are omitted here.

Figure 5:
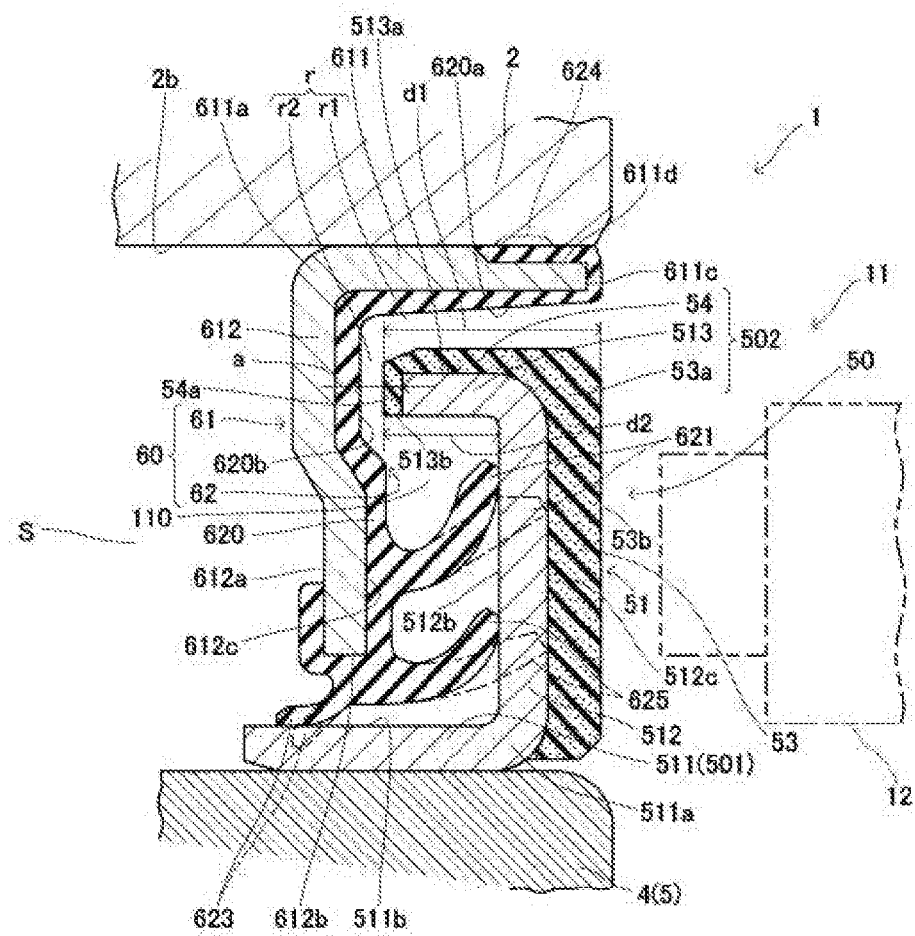
FIG. 5, similar to FIG. 2, illustrates a modified example of the sealing device of the present invention.

FIG. 5 illustrates a modification of the second embodiment. In the bearing seal 11, i.e., the sealing device, of the modification, the cylindrical elastic member 54 is integrally fixed to the outer circumference of the second cylindrical portion 513 of the slinger 51 constituted in the same manner as that in FIG. 4. Like the embodiment in FIG. 4, the annular encoder 53 is integrally fixed to the vehicle body side face 512c of the circular plate portion 512 of the slinger 51. The elastic member 54 is made of rubber material including magnetic powder, is connected to the annular encoder 53, and is integrally molded by vulcanization to the second cylindrical portion 513 at the same time when the annular encoder 53 is molded by vulcanization. The cylindrical elastic member 54 further has an end-covering portion 54a covering the end face 513b on the bearing space side S of the second cylindrical portion 513. The outer diametrical side cylindrical portion 502 of the first member 50 is constituted by the second cylindrical portion 513 of the slinger 51 covered with the elastic member 54 and the outer diametrical side end portion 53a of the annular encoder 53.

Also in this modification, the labyrinth structure portion "r" is formed between the outer diametrical side cylindrical portion 502 and the second member 60. The labyrinth structure portion "r" is constituted with the first labyrinth portion r1 formed in the axial direction along the shaft L and the second labyrinth portion r2 formed along the radial direction, the second labyrinth portion r2 being connected to the first labyrinth portion r1. The length d1 of the first labyrinth portion r1 in the axial direction is the sum of the distance value between the end of the vehicle body side face 512c of the circular plate 512 of the slinger 51 and an end face 513b of the second cylindrical portion 513, the thickness value of the end-covering portion 54a of the cylindrical elastic member 54 in the axial direction, and the thickness value of the annular encoder 53 in the axial direction along the shaft L. The length d1 of the first labyrinth portion r1 in the axial direction is set equal to or larger than 1.5 mm depending on the specification of the sealing device 11 or within a space range where the sealing device 11 is provided, as mentioned above. The length d2 of the inner diametrical side region of the outer diametrical side cylindrical portion 502 of the first member 50 is the sum of the length value of the inner diametrical side region of the second cylindrical portion 513 in the axial direction along the shaft L and the thickness value of the end-covering portion 54$a$ of the cylindrical elastic member 54 in the axial direction. The length d2 is set equal to or larger than 0.75 mm depending on the specification of the sealing device 11 or within a space range where the sealing device 11 is provided, as mentioned above. The gap "a" of the second labyrinth portion r2 is a gap between the end-covering portion 54$a$ and the vehicle body side face 620$b$ facing 54$a$ of the seal lip base portion 620 and is set equal to or less than 1 mm depending on the specification including the mechanical tolerance of the sealing device 11 or within a space range where the sealing device 11 is provided.

Also in this modification, when the bearing seal 11 is incorporated into the bearing device 1 in FIG. 1 and the inner ring 5 rotates around the shaft L, muddy water is suppressed from intruding into the space portion 110 by the first and the second labyrinth portions r1, r2 as mentioned above. In addition, when only a little amount of muddy water intrudes into the space portion 110, the intruded muddy water is gradually accumulated in the space portion 110. Then, dust in the accumulated muddy water is jammed into an elastic contact portion of the side lip 621 to the vehicle wheel side face 512$b$ of the circular plate portion 512, thereby the tip end of the side lip 621 is worn away by the elastic sliding contact in accordance with the rotation of the inner ring 5. However, another side lip 625 provided on an inner diametrical side rather than the side lip 621 elastically contacts the vehicle wheel side face 512$b$ of the circular plate portion 512. Therefore, even when the tip end of the side lip 621 is worn away and muddy water passes through the elastic contact portion of the side lip 621 to the circular plate portion 512, the side lip 625 blocks further proceeding of the intruded muddy water. As a result, the seal performance of the bearing seal 11 is kept for a long time. In addition, as understood from the results of the performance tests to be mentioned later referring to FIG. 6 and FIG. 7, when the axial length d1 of the first labyrinth portion r1, the axial length d2 of the inner diametrical side region of the outer diametrical side cylindrical portion 502, and the gap "a" of the second labyrinth portion r2 are set as mentioned above, the discharge performance of muddy water once intruded in the space portion 110 is effectively achieved and the life of the bearing seal 11 is elongated.

Other structures are the same as those in the above-mentioned embodiments, so the same members have the same reference numerals and the function and advantageous effects are omitted here.

Although the annular encoder 53 is provided for the slinger 51 in FIG. 4 and FIG. 5, the present invention is not limited to the annular encoder and an annular body made of elastic material such as rubber can be used.

Next, the method and the results of a performance test of the sealing device of the present invention are explained below referring to FIG. 6 and FIG. 7.

<Method of Performance Test>

The performance test here was carried out in the method below. First of all, bearing seals mentioned above were mounted between the inner ring and the outer ring that simulate the bearing. Then, the simulated bearing as mentioned above was put in a container including liquid simulating muddy water and a lower half of the bearing under the shaft L (refer to FIG. 1) was dipped in the liquid. In such a condition, the inner ring was rotated at 1100 rpm around the shaft L, a cycle of 20-hour operation and 4-hour stop was repeated, a portion on the bearing space S side (refer to FIG. 1) in each bearing seal was observed, and the time from start of rotation to leakage of liquid from the portion was measured. In FIG. 6, Samples 1 to 3 respectively correspond to the bearing seals illustrated in FIG. 2, FIG. 3 and FIG. 5. In the comparison example in each sample, the slinger has a section in the form of the letter L and is not provided with the second cylindrical portion, d2 is zero, and the gap "a" does not constitute a labyrinth, namely out of the coverage of the present invention. It shows that the experimental example in each sample is within the scope of the present invention. In the test results, namely sealing life, in each sample in FIG. 6 and FIG. 7, when the value of the result of the comparison example, i.e., the above-mentioned time, is set to be one, the result of the experimental example is represented by the ratio relative to each comparison example. In FIG. 7 "C" represents the comparison sample and "E" represents the experimental example.

<Observation on Test Result>

Figure 7A:
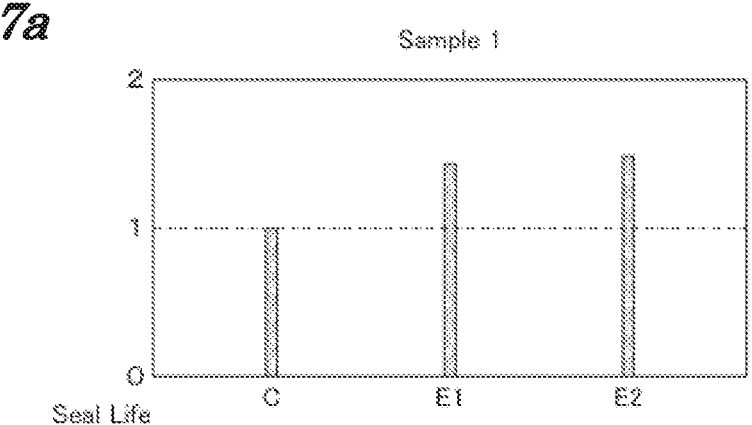
FIG. 7a, FIG. 7b, and FIG. 7c are graphs representing the results in FIG. 6.
Figure 7B:
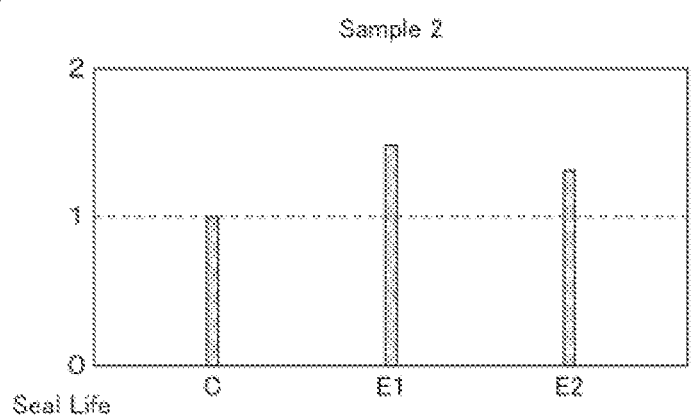
Figure 7C:
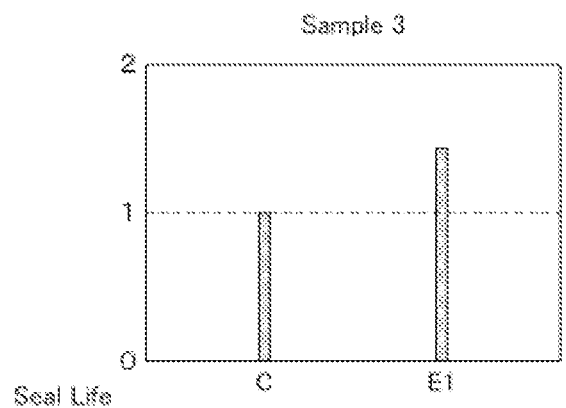

In FIG. 6 and FIG. 7, it is understood that the sealing life of the experimental example is longer than that in each comparison example when the axial length d1 of the first labyrinth portion r1 is equal to or larger than 1.5 mm, the axial length d2 of the inner diametrical side region of the outer diametrical side cylindrical portion 502 of the first member 50 is equal to or larger than 0.75 mm and the gap "a" of the second labyrinth portion r2 is equal to or less than 1 mm. In the experimental example in each sample, it is understood that even when muddy water intrudes into the space portion 110 of each bearing seal 11, muddy water is easily discharged to outside, namely opposite to the bearing space S through the labyrinth structure portion "r" by the centrifugal force and the pumping action by the axial rotation of the first member 50 in accordance with the axial rotation of the inner ring 5. The muddy water intruded in the space portion 110 is rapidly discharged and is suppressed from staying in the space portion 110. Thus, dust and so on contained in muddy water is hardly jammed into the elastic slidably contacting portion of the seal lips 621 . . . and the first member 50, thereby suppressing deterioration of the sealing life caused by abrasion of the seal lips 621 . . . .

Such a test corresponds to a duration test of a bearing sealing device supposing that a vehicle runs on a rough road with many bumps and puddles. Therefore, the test results show that the sealing device of the present invent has good durability on a rough road even when a vehicle runs under severe conditions.

The above-mentioned embodiments explain that the sealing device of the present invention is applied to the bearing device for a vehicle. However, the present invention is not limited to such an aspect; if the sealing device is mounted between two members in which the inner member is supported in an axially rotatable manner relative to the outer member, the sealing device of the present invention is suitably applied to the bearing device in the field of other industries. Even if the bearing device is for the vehicle, the bearing device is not limited to the one as illustrated in FIG. 1 and can be in other forms. The shape of the core member and the seal lip portion fixed to the core member are not limited to those in the figures; and also fitting ways or the like between the core member and the outer ring are not limited to those in the figures. Furthermore, the shape of the side lip and the radial lips can be appropriately modified according to the required specifications or the like.

REFERENCE SIGNS LIST 2 outer ring (outer member)
5 inner ring (inner member)
11 bearing seal (sealing device)
50 first member
501 inner diametrical side cylindrical portion
502 outer diametrical side cylindrical portion
51 slinger
511 first cylindrical portion (inner diametrical side cylindrical portion)
512 circular plate portion
512a outer circumferential edge portion
513 second cylindrical portion (outer diametrical side cylindrical portion)
53 annular encoder
53a outer diametrical side end portion
54 elastic member
60 second member
61 core member
62 seal lip portion
r1 first labyrinth portion
r2 second labyrinth portion
d1 axial length of first labyrinth portion
d2 axial length of inner diametrical side region of outer diametrical side cylindrical portion
a gap of second labyrinth portion
L shaft

The invention claimed is:

1. A sealing device provided between an outer member and an inner member that coaxially rotates relative to the outer member, the sealing device comprising:
  a first member and a second member being combined,
  the first member being in a form of a double cylinder and including an inner diametrical side cylindrical portion that is fitted onto the inner member, a circular plate portion that extends into outer diametrical direction from the inner diametrical side cylindrical portion, and an outer diametrical side cylindrical portion that extends from an outer circumferential edge portion of the circular plate portion,
  the second member having a core member and a seal lip portion made of elastic material, the core member having a core member cylindrical portion that is fitted into an inner diametrical face of the outer member and an inward flange portion that extends into inner diametrical direction from an end portion of the core member cylindrical portion, the seal lip portion that is fixed to the core member and elastically contacts the first member,
  the inner diametrical side cylindrical portion and the outer diametrical side cylindrical portion of the first member extending toward the second member along axial direction,
  a first labyrinth portion being provided along axial direction between an outer diametrical side portion of the outer diametrical side cylindrical portion of the first member and the core member cylindrical portion of the second member,
  a second labyrinth portion, connected to the first labyrinth portion, being provided along radial direction between an end face of the outer diametrical side cylindrical portion of the first member and the inward flange portion of the second member,
  the first labyrinth portion being equal to or more than 1.5 mm in length in axial direction,
  the seal lip portion elastically contacting the circular plate portion of the first member,
  a space portion being provided between the outer diametrical side cylindrical portion and the seal lip portion, and
  a gap reaching the space portion between the second member and the outer diametrical side cylindrical portion being constituted only by the first labyrinth portion and the second labyrinth portion.

2. The sealing device as set forth in claim 1,
  wherein an inner diametrical region of the outer diametrical side cylindrical portion of the first member is equal to or more than 0.75 mm in length in axial direction.

3. The sealing device as set forth in claim 2,
  wherein the second labyrinth portion includes a gap equal to or less than 1 mm in length.

4. The sealing device as set forth in claim 2,
  wherein the first member has a slinger in a form of a double cylinder, the slinger comprising a first cylindrical portion that is fitted onto the inner member, a circular plate portion that extends into outer diametrical direction from the first cylindrical portion, and a second cylindrical portion extending from an outer circumferential edge portion of the circular plate portion, the circular plate portion of the slinger being integrally fixed with an annular encoder for detecting rotation, and
  wherein the second cylindrical portion of the slinger and an outer diametrical side end portion of the annular encoder constitute the outer diametrical side cylindrical portion of the first member.

5. The sealing device as set forth in claim 4,
  wherein the second cylindrical portion of the slinger is integrally fixed with a cylindrical elastic member on an outer circumferential face, and
  wherein the second cylindrical portion of the slinger that is covered with the elastic member and the outer diametrical side end portion of the annular encoder constitute the outer diametrical side cylindrical portion of the first member.

6. The sealing device as set forth in claim 1,
  wherein the second labyrinth portion includes a gap equal to or less than 1 mm in length.

7. The sealing device as set forth in claim 6,
  wherein the first member has a slinger in a form of a double cylinder, the slinger comprising a first cylindrical portion that is fitted onto the inner member, a circular plate portion that extends into outer diametrical direction from the first cylindrical portion, and a second cylindrical portion extending from an outer circumferential edge portion of the circular plate portion, the circular plate portion of the slinger being integrally fixed with an annular encoder for detecting rotation, and
  wherein the second cylindrical portion of the slinger and an outer diametrical side end portion of the annular encoder constitute the outer diametrical side cylindrical portion of the first member.

8. The sealing device as set forth in claim 7,
  wherein the second cylindrical portion of the slinger is integrally fixed with a cylindrical elastic member on an outer circumferential face, and
  wherein the second cylindrical portion of the slinger that is covered with the elastic member and the outer diametrical side end portion of the annular encoder constitute the outer diametrical side cylindrical portion of the first member.

9. The sealing device as set forth in claim 1, wherein the first member has a slinger in a form of a double cylinder, the slinger comprising a first cylindrical portion that is fitted onto the inner member, a circular plate portion that extends into outer diametrical direction from the first cylindrical portion, and a second cylindrical portion extending from an outer circumferential edge portion of the circular plate portion, the circular plate portion of the slinger being integrally fixed with an annular encoder for detecting rotation, and wherein the second cylindrical portion of the slinger and an outer diametrical side end portion of the annular encoder constitute the outer diametrical side cylindrical portion of the first member.

10. The sealing device as set forth in claim 9, wherein the second cylindrical portion of the slinger is integrally fixed with a cylindrical elastic member on an outer circumferential face, and wherein the second cylindrical portion of the slinger that is covered with the elastic member and the outer diametrical side end portion of the annular encoder constitute the outer diametrical side cylindrical portion of the first member.

* * * * *